US008035917B2

(12) United States Patent
Sato

(10) Patent No.: US 8,035,917 B2
(45) Date of Patent: Oct. 11, 2011

(54) DISK DEVICE HAVING HUB WITH ENGAGING GROOVE

(75) Inventor: Yoshinori Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 955 days.

(21) Appl. No.: 11/819,393

(22) Filed: Jun. 27, 2007

(65) Prior Publication Data
US 2008/0002286 A1 Jan. 3, 2008

(30) Foreign Application Priority Data

Jun. 30, 2006 (JP) ................. 2006-182692

(51) Int. Cl.
*G11B 17/08* (2006.01)
*G11B 17/02* (2006.01)
(52) U.S. Cl. ................ 360/98.08; 360/99.12
(58) Field of Classification Search ........ 360/98.08, 360/99.05, 99.12
See application file for complete search history.

(56) References Cited

U.S. PATENT DOCUMENTS

| | | | | |
|---|---|---|---|---|
| 4,680,656 | A * | 7/1987 | Manzke et al. | 360/97.03 |
| 4,758,915 | A * | 7/1988 | Sakaguchi | 360/99.04 |
| 5,031,061 | A * | 7/1991 | Hatch | 360/98.07 |
| 5,715,114 | A * | 2/1998 | Gotou | 360/98.08 |
| 6,201,661 | B1 * | 3/2001 | Korkowski | 360/98.08 |
| 7,224,551 | B1 * | 5/2007 | Ou-Yang et al. | 360/98.08 |
| 2002/0109939 | A1 * | 8/2002 | Schwandt et al. | 360/99.12 |
| 2003/0112552 | A1 * | 6/2003 | Choo et al. | 360/99.12 |
| 2005/0099723 | A1 | 5/2005 | Momoi | |
| 2006/0002013 | A1 * | 1/2006 | Chan et al. | 360/99.12 |

FOREIGN PATENT DOCUMENTS

| | | |
|---|---|---|
| JP | 11-296943 | 10/1999 |
| JP | 2001-035129 | 2/2001 |
| JP | 2002-157800 | 5/2002 |
| JP | 2002-343002 | 11/2002 |
| JP | 2004-295962 | 10/2004 |
| JP | 2005-235385 | 9/2005 |
| JP | 2006-147100 | 6/2006 |
| JP | 2006-318629 | 11/2006 |

OTHER PUBLICATIONS

Japanese Office Action dated May 27, 2008 for Appln. No. 2006-182692.

* cited by examiner

*Primary Examiner* — Daniell L Negron
*Assistant Examiner* — Adam B Dravininkas
(74) *Attorney, Agent, or Firm* — Pillsbury Winthrop Shaw Pittman, LLP

(57) ABSTRACT

A disk device is presented that includes a drive motor which has a rotatable hub fitted with a recording medium and rotates the recording medium, and a disk-shaped clamper attached to the hub to hold the recording medium. The clamper has a center aperture formed on a central axis of rotation of the drive motor and at least one positioning hole eccentric to the central axis of rotation. The clamper is fixed to the hub by a fixing screw driven into the center aperture. The hub has a support surface opposed to the clamper and an annular engaging groove formed in the support surface to be coaxial with the central axis of rotation and opposed to the positioning hole, the engaging groove being configured to be engaged with a fixing pin which is passed through the positioning hole.

4 Claims, 5 Drawing Sheets

DISK DEVICE HAVING HUB WITH ENGAGING GROOVE

CROSS-REFERENCE TO RELATED APPLICATIONS

This application is based upon and claims the benefit of priority from Japanese Patent Application No. 2006-182692, filed Jun. 30, 2006, the entire contents of which are incorporated herein by reference.

BACKGROUND

1. Field

One embodiment of the invention relates to a disk device having a disk for use as a recording medium and a method of assembling the same.

2. Description of the Related Art

In recent years, disk devices, such as magnetic disk devices, optical disk devices, etc., have been widely used as external recording devices of computers or image or music recording/reproducing apparatuses.

For example, a magnetic disk device generally comprises a spindle motor, magnetic head, carriage assembly, and voice coil motor (VCM). The spindle motor rotates a magnetic disk for use as a recording medium. The magnetic head serves to record and reproduce information to and from the magnetic disk. The carriage assembly supports the magnetic head for movement with respect to the disk. The VCM serves to drive the carriage assembly, thereby moving to and positioning the head in a region over a desired track of the disk.

The spindle motor has a cylindrical hub that serves as a rotor, and a flange is formed on one end side of the hub. The magnetic disk is fitted on the hub and held between a clamper, which is screwed to the upper end of the hub, and the flange of the hub.

Usually, the clamper is formed of a disk-shaped metal plate, which has an abutting portion on its peripheral edge portion that touches the magnetic disk. An aperture for the passage of a screw is formed in the central portion of the clamper. The clamper is provided with a plurality of positioning holes that are situated in positions eccentric to the aperture. The clamper is fixed to the hub of the spindle motor by driving the screw, which is passed through the aperture, into the upper end of the hub and fastening it to the upper surface of the hub, with its peripheral edge portion in contact with the upper surface of the inner peripheral portion of the magnetic disk. As the central portion is fastened by the screw, a flat portion of the clamper is elastically deformed, and a disk clamping force is obtained based on a resulting tensile stress.

Normally, in fixing the clamper to the hub of the spindle motor, the clamper and the hub must be held lest they race. In a conventional magnetic disk device, as described in, for example, Jpn. Pat. Appln. KOKAI Publication No. 2002-343002, therefore, the upper surface of a hub is provided with a plurality of engaging holes corresponding to positioning holes in a clamper. The clamper and the hub are fixed to each other in a manner such that fixing pins are fitted individually into the engaging holes of the hub through the positioning holes of the clamper from above the clamper.

In the conventional magnetic disk device described above, however, the respective positions of the positioning holes, engaging holes, and fixing pins must be all aligned when the clamper and the hub are fixed together, in order to fit the fixing pins into both the positioning holes of the clamper and the engaging holes of the hub. In other words, the respective rotational angles of the individual components must be all coincident when the centers of the components are aligned with a central axis of rotation.

In order to realize such position alignment by the use of an automatic assembly apparatus, for example, it is supposed to be relatively easy to adjust the positional relationship between the clamper and the fixing pins that can be easily handled for alignment with use of a tray or the like. Since the hub is rotatable, however, the positions of the engaging holes are too irregular to be managed practically. Thus, the assembly apparatus requires a function to recognize the positions of the engaging holes of the hub, a hole position alignment mechanism, etc., so that its construction is inevitably complicated and entails an increase in manufacturing cost.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
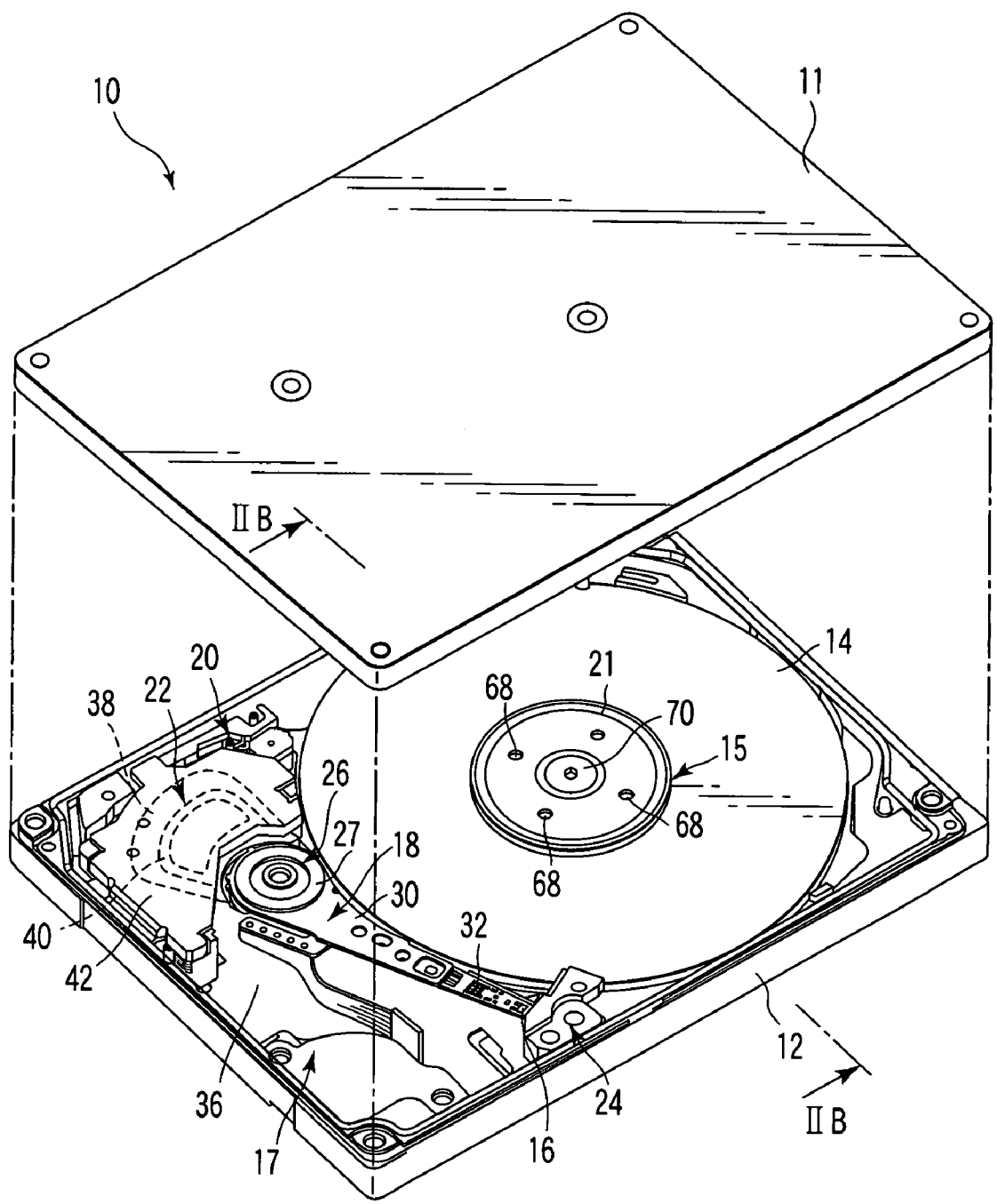
FIG. 1 is an exemplary exploded perspective view showing an HDD according to a first embodiment of the invention.

Various embodiments according to the invention will be described hereinafter with reference to the accompanying drawings. In general, according to one embodiment of the invention, there is provided a disk device comprising: a disk-shaped recording medium; a drive motor which has a rotatable hub fitted with the recording medium and rotates the recording medium; a disk-shaped clamper which is attached to the hub and holds the recording medium; a head which records and reproduces information to and from the recording medium; and a head actuator which supports the head for movement and causes the head to move with respect to the recording medium, the clamper having a center aperture formed on a central axis of rotation of the drive motor and at least one positioning hole eccentric to the central axis of rotation, the clamper being fixed to the hub by a fixing screw driven into the hub through the center aperture, the hub having a support surface opposed to the clamper and an annular engaging groove formed in the support surface to be coaxial with the central axis of rotation and opposed to the positioning hole, the engaging groove being configured to be engaged with a fixing pin which is passed through the positioning hole of the clamper.

According to another embodiment, there is provided a method of assembling a disk device, which comprises a disk-shaped recording medium, a drive motor which has a rotatable hub fitted with the recording medium and rotates the recording medium, a disk-shaped clamper which is attached to the hub and holds the recording medium, a head which records and reproduces information to and from the recording medium, and a head actuator which supports the head for movement and causes the head to move with respect to the recording medium, the clamper having a center aperture formed on a central axis of rotation of the drive motor and at least one positioning hole eccentric to the central axis of rotation and being fixed to the hub by a fixing screw driven into the hub through the center aperture, the hub having a support surface opposed to the clamper and an annular engaging groove formed in the support surface to be coaxial with the central axis of rotation and opposed to the positioning hole, the engaging groove being configured to be engaged with a fixing pin which is passed through the positioning hole of the clamper, the method comprising: attaching the recording medium to the hub of the disk device; placing the clamper on the support surface of the hub with the clamper being aligned with the recording medium and the hub; restraining rotation of the clamper by passing the fixing pin through the positioning hole of the clamper and causing the fixing pin to engage the engaging groove of the hub; and fixing the clamper to the hub by driving the fixing screw into the hub through the center aperture of the clamper which is restrained from rotating.

A first embodiment in which a disk device of this invention is applied to a hard disk drive (HDD) will now be described in detail with reference to the accompanying drawings.

As shown in FIG. 1, the HDD is provided with a housing 10. The housing 10 comprises a base 12 in the form of an open-topped rectangular box and a top cover 11 shaped like a rectangular plate. The top cover is fastened to the base by screws so as to close a top opening of the base. Thus, the inside of the housing 10 is kept airtight so that it can be ventilated only through a breathing filter (not shown).

The base 12 carries thereon a magnetic disk 14 as a recording medium, a spindle motor 15 that supports and rotates the magnetic disk, and a plurality of, e.g., two, magnetic heads 16 that record and reproduce information to and from the magnetic disk. The base 12 further carries a head actuator 18, which supports the magnetic heads 16 for movement with respect to surfaces of the disk 14, and a voice coil motor (VCM) 22 that rocks and positions the head actuator. Provided on the base 12, furthermore, are a ramp load mechanism 24, an inertia latch mechanism 20, and a flexible printed circuit board unit (FPC unit) 17. The ramp load mechanism 24 holds the magnetic heads 16 in a position at a distance from the magnetic disk when the heads are moved to the outermost periphery of the disk. The inertia latch mechanism 20 holds the head actuator in a retracted position if a shock or the like acts on the HDD. Electronic components, such as a preamplifier, are mounted on the FPC unit 17.

A printed circuit board (not shown) for controlling the operations of the spindle motor 15, VCM 22, and magnetic heads through the FPC unit 17 is screwed to the outer surface of the base 12 and located opposite a bottom wall of the base.

The magnetic disk 14 is formed having a diameter of, for example, 22 mm (0.85 inch) and has magnetic recording layers on its upper and lower surfaces, individually. The disk 14 is coaxially fitted on a hub (mentioned later) of the spindle motor 15, clamped by a clamper 21, and fixed to the hub. The disk 14 is rotated at a predetermined speed of, for example, 3,600 rpm by the motor 15 for use as a drive motor.

The head actuator 18 is provided with a bearing assembly 26 that is fixed on the bottom wall of the base 12. The bearing assembly 26, which functions as a bearing portion, has a pivot set up on the bottom wall of the base 12 and a cylindrical hub 27 that is rotatably supported on the pivot by a pair of bearings. The head actuator 18 is provided with arms 30 attached to the hub 27, suspensions 32 extending from the arms, the magnetic heads 16 supported on the respective extended ends of the suspensions, and spacer rings.

Each magnetic head 16 has a substantially rectangular slider (not shown) and a recording/reproducing magneto resistance (MR) head element formed on the slider. It is fixed to a gimbals portion that is formed on the distal end portion of each suspension 32. Each magnetic head 16 is electrically connected to a main FPC 36 (mentioned later) through a relay flexible printed circuit board (relay FPC, not shown). The relay FPC is pasted on respective surfaces of each arm 30 and each suspension 32 of the head actuator 18 and extends from the distal end of the suspension to the rocking proximal end of the arm. The relay FPC is formed in the shape of an elongate belt as a whole, its distal end is electrically connected to the magnetic head 16, and its proximal end portion is electrically connected to the main FPC 36. Thus, each magnetic head 16 is electrically connected to the FPC unit 17 through the relay FPC and the main FPC 36.

The arms 30 that are fitted on the outer periphery of the hub 27 are arranged spaced from and parallel to each other. The suspensions 32 and the magnetic heads 16 that are mounted on these arms are situated opposite one another with the magnetic disk 14 between them. The VCM 22 has a support frame 38 extending from the hub 27 in the direction opposite from the arms 30 and a voice coil 40 supported by the support frame. When the head actuator 18 is set in the base 12, the voice coil 40 is situated between a pair of yokes 42 that are fixed on the base 12 and, in conjunction with these yokes and a magnet fixed to one of the yokes, constitutes the VCM 22.

If the voice coil is energized with the magnetic disk 14 in rotation, the head actuator 18 rocks, whereupon each magnetic head 16 is moved to and positioned in a region over a desired track of the disk 14. As this is done, the magnetic heads 16 are moved along the radial direction of the magnetic disk 14 between the inner and outer peripheral edge portions of the disk.

The following is a description of the spindle motor 15 and the clamper 21.

Figure 2A:
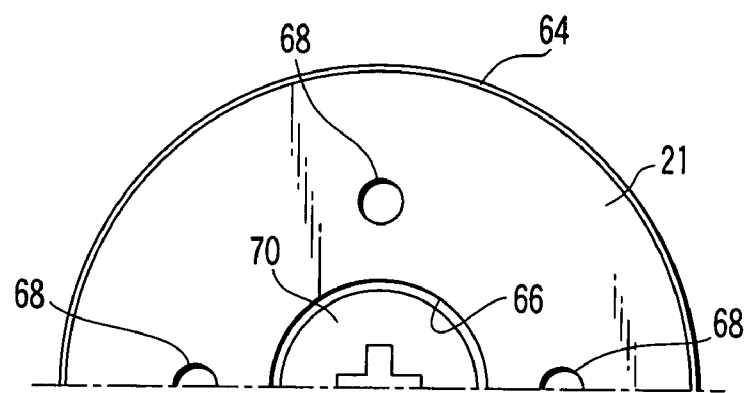
FIG. 2A is an exemplary plan view showing a spindle motor and a clamper in the HDD.
Figure 2B:
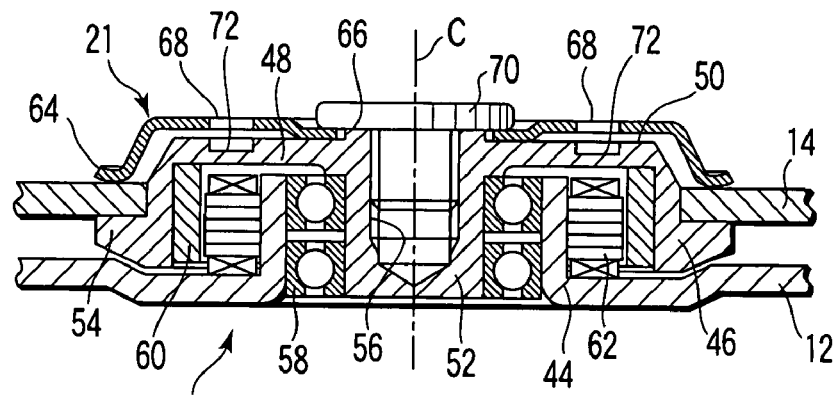
FIG. 2B is an exemplary sectional view of the spindle motor taken along line IIB-IIB of FIG. 1.
Figure 3:
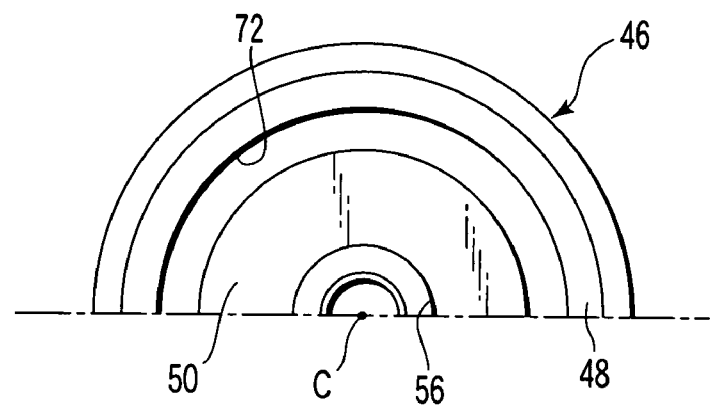
FIG. 3 is an exemplary plan view showing a support surface of a hub of the spindle motor.

FIGS. 2A and 2B are a plan view of the clamper 21 and a sectional view of the spindle motor 15, respectively, and FIG. 3 shows a support surface (mentioned later) of the hub of the spindle motor.

As shown in FIGS. 2A, 2B and 3, the spindle motor 15 has a cylindrical support sleeve 44, which is formed integrally with the bottom wall of the base 12, and a hub 46 that is rotatably supported on the support sleeve and serves as a rotor.

The hub 46 is in the form of a cylinder of which the top is closed by an end wall 48. The upper surface of the end wall 48, which is formed substantially flat, constitutes a support surface 50. The spindle motor 15 has a spindle 52 that is formed integrally with the hub 46. The spindle 52 protrudes from the center of the end wall 48 and extends inside and coincidentally with the hub 46. An annular flange 54 is formed around the lower end portion of the hub 46. A threaded hole 56 is formed in the central portion of the end wall 48 and the spindle 52 and extends concentrically with the hub 46.

The spindle 52 is coaxially inserted in the support sleeve 44, while the hub 46 is coaxially located around the support sleeve 44. A pair of ball bearings 58 are fitted between the spindle and the support sleeve 44. Thus, the hub 46 and the spindle 52 are supported by the ball bearings 58 for rotation around a central axis C with respect to the support sleeve 44.

An annular permanent magnet 60 is coaxially fixed to the inner peripheral surface of the hub 46. A stator 62, which has a core and a coil, is attached to the outer periphery of the support sleeve 44 and faces and adjoins the permanent magnet 60. When the coil of the stator 62 is energized, a driving torque is generated to rotate the hub 46.

The magnetic disk 14 is coaxially fitted on the outer peripheral surface of the hub 46 of the spindle motor 15 and situated on the flange 54. The disk 14 is held between the flange 54 and the disk-shaped clamper 21, which is screwed to the end wall 48 of the hub 46, and is fixed to the outer periphery of the hub 46.

The following is a detailed description of the clamper 21 that functions as a disk retainer. As shown in FIGS. 2A and 2B, the clamper 21 is a disk that is formed by drawing stainless steel (SUS410) of 0.5-mm thickness, for example. The peripheral edge portion of the clamper 21 is first lowered by one step and then slightly bent upward with a desired curvature radius. Thus, it forms an annular abutting portion 64 that abuts against the upper surface of the inner peripheral portion of the magnetic disk 14. The outside diameter of the clamper 21 is larger than that of the hub 46 and substantially equal to the diameter of the flange 54.

The clamper 21 is formed having a center aperture 66 for the passage of a fixing screw 70 and a plurality of, e.g., four, positioning holes 68. The center aperture 66 is situated on the center of the clamper 21, that is, on the central axis C of rotation of the spindle motor 15, while the positioning holes 68 are situated in positions eccentric to the central axis. The positioning holes 68 are arranged at regular intervals on a circle that is concentric with the central axis C. The positioning holes 68 are used for the attachment of a jig that prevents clamper rotation when the clamper 21 is screwed to the hub 46 in the aforesaid manner.

The clamper 21 is set on the support surface 50 of the hub 46 in a manner such that the center aperture 66 is aligned with the threaded hole 56 of the hub 46 and that the abutting portion 64 is in contact with the upper surface of the inner peripheral surface of the magnetic disk 14. The clamper 21 is screwed to the hub 46 by driving the fixing screw 70 into a threaded hole 56 of the hub. When the clamper 21 is screwed in this manner, its central portion is pressed by a head portion of the fixing screw 70 so as to be held between the end wall 48 of the hub 46 and the head portion. The abutting portion 64 of the clamper 21 is pressed against the inner peripheral portion of the magnetic disk 14 by the elastic force of the clamper 21.

As shown in FIGS. 2A, 2B and 3, an annular engaging groove 72 is formed in that part of the support surface 50 of the hub 46 which faces the positioning holes 68 of the clamper 21. The engaging groove 72 is located coaxially with the central axis C and has a diameter substantially equal to that of the concentric circle on which are positioning holes 68 are situated. The width of the engaging groove 72 is substantially equal to the diameter of each positioning hole 68. In screwing the clamper 21 to the hub 46, as mentioned later, a fixing pin of the jig for preventing clamper rotation is caused to engage the engaging groove 72.

Figure 4:
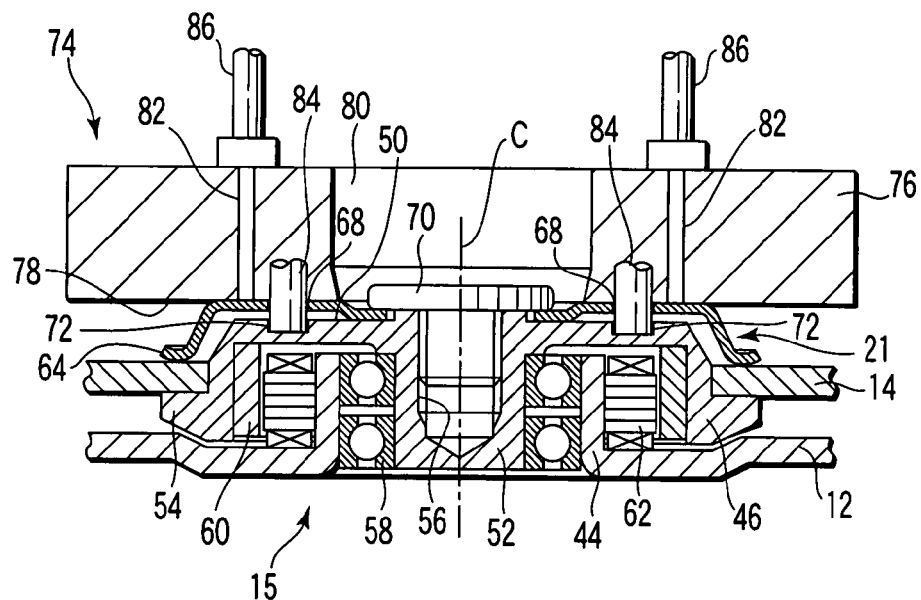
FIG. 4 is an exemplary sectional view showing the spindle motor and a mounting jig for attaching the clamper to the hub of the motor.
Figure 5A:
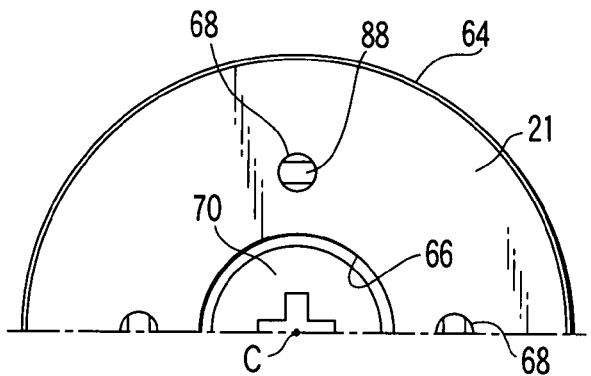
FIG. 5A is an exemplary plan view showing a spindle motor and a clamper in an HDD according to a second embodiment of the invention.
Figure 5B:
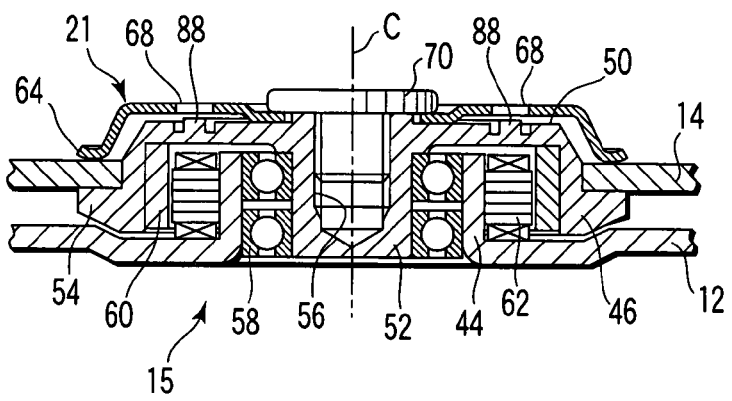
FIG. 5B is an exemplary sectional view showing the spindle motor and the clamper in the HDD according to the second embodiment.
Figure 6A:
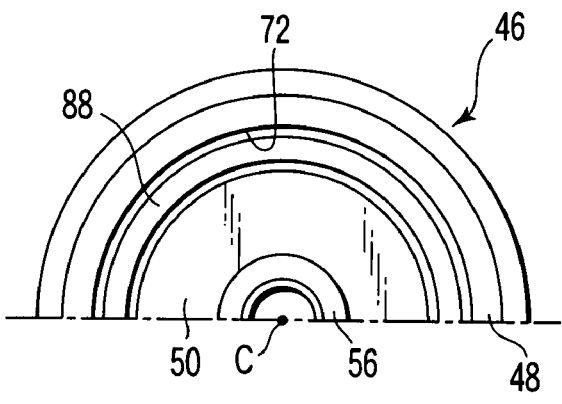
FIG. 6A is an exemplary plan view showing a support surface of the spindle motor in the HDD according to the second embodiment.
Figure 6B:
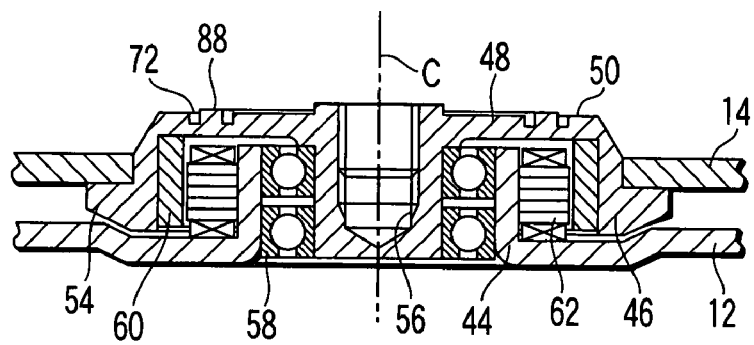
FIG. 6B is an exemplary sectional view of the spindle motor in the HDD according to the second embodiment.

Then, in assembling the HDD, the clamper 21 is attached to the hub 46 of the spindle motor 15 in the following processes. As shown in FIG. 4, the clamper 21 is first attached to a mounting jig 74 of an assembly apparatus.

The mounting jig 74 has, for example, a disk-shaped jig body 76. The jig body 76 has a flat contact surface 78 to be in contact with the clamper 21, a through hole 80, which is bored through the center of the jig body and through which the fixing screw 70 is passed, and a plurality of suction holes 82 that individually open in the contact surface 78. Each suction hole 82 is connected to a suction pump (not shown) by a suction pipe 86. A plurality of, e.g., four, fixing pins 84 are embedded in the jig body 76 and protrude downward from the contact surface 78. The fixing pins 84 are formed in positions and having a diameter such that they can be passed individually through the positioning holes 68 of the clamper 21. More specifically, the four fixing pins 84 are arranged at regular intervals on a circle that is concentric with the through hole 80.

In attaching the clamper 21 to the mounting jig 74 constructed in this manner, the fixing pins 84 are positioned with respect to the positioning holes 68 of the clamper 21, and the clamper 21 is then sucked in through the suction holes 82, whereupon the clamper 21 is attracted to the contact surface 78 of the jig body 76. As this is done, the four fixing pins 84 are passed individually through the positioning holes 68 of the clamper 21.

Subsequently, the clamper 21 that is attached to the mounting jig 74 is located on the support surface 50 of the hub 46 of the spindle motor 15. In doing this, the respective distal end portions of the four fixing pins 84 are caused to engage the engaging groove 72 of the hub 46. These four fixing pins 84 serve to restrain the rotation of the clamper 21 and the hub 46. In this state, the fixing screw 70 is inserted through the through hole 80 of the jig body 76 and driven into the threaded hole 56 of the hub 46 through the center aperture 66 of the clamper 21. Thereupon, the clamper 21 is attached to the hub 46, and the magnetic disk 14 is fixed to the hub 46 by the clamper 21.

In driving the fixing screw 70, the hub 46 sometimes may race. In this case, for example, a constant DC current is applied to the stator 62 of the spindle motor 15, whereby a rotational force or torque in a direction opposite to the driving direction of the fixing screw 70 is applied to the hub 46. Thus, the hub 46 is restrained from racing.

Alternatively, the clamper 21 may be pressed against the hub 46 and the magnetic disk 14 by the jig body 76 from above. If this is done, a friction torque is generated between the magnetic disk 14 and the hub 46, and the hub is restrained from racing by the friction torque. The jig body 76 may be pressed by the load of the mounting jig 74 itself or by means of an independent pressing mechanism.

After the clamper 21 is attached, the suction through the suction holes 82 is stopped as the mounting jig 74 is pulled up, whereby the fixing pins 84 are drawn out of the hub 46 and the clamper 21. Thereupon, fixing the clamper 21 is finished.

According to the HDD and the assembly method arranged in this manner, the clamper can be fixed by using only the positioning holes and the fixing pins on the clamper without the use of the conventional positioning holes that are provided intermittently in the support surface of the hub so as to be concentric with the central axis. More specifically, the hub of the spindle motor is shaped symmetrical with respect to the central axis C, and the annular engaging groove 72 is provided in the hub support surface lest the hub and the fixing pins interfere with one another. According to this arrangement, the clamper to be attached can be fixed by means of the simple assembly apparatus without requiring the hub 46 to be positioned. Thus, there may be obtained a disk device in which the clamper can be fixed with ease and an assembly method therefor.

The following is a description of an HDD according to a second embodiment of the invention. According to the second embodiment, as shown in FIGS. 5A and 5B and FIGS. 6A and 6B, a support surface 50 of a hub 46 of a spindle motor 15 is formed having an annular engaging groove 72 that is situated coaxially with a central axis C of rotation. Further, an annular rib 88 that is coaxial with the central axis C is provided in the engaging groove 72 and slightly projects from the support surface 50. The rib 88 constitutes an abutting portion to be touched by fixing pins 84 that are passed individually through positioning holes 68 in a clamper 21.

Figure 7:
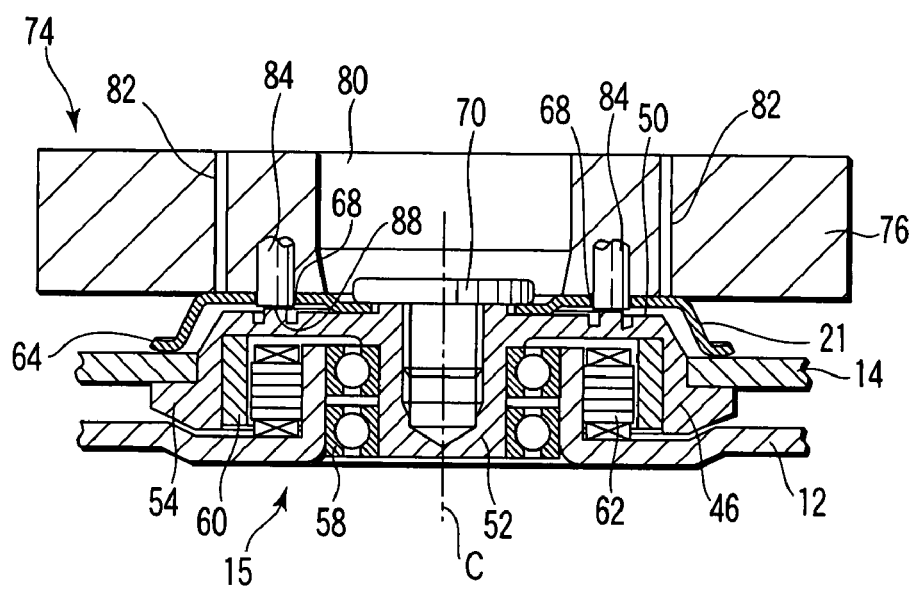
FIG. 7 is an exemplary sectional view showing the spindle motor and a mounting jig for attaching the clamper to a hub of the motor.

Since other configurations of the HDD of the second embodiment are the same as those of the foregoing first embodiment, like reference numerals are used to designate like portions, and a detailed description of those portions is omitted. In the second embodiment, the clamper 21 is attached to the hub 46 by the same method using the same mounting jig 74 of the first embodiment, as shown in FIG. 7.

Figure 8A:
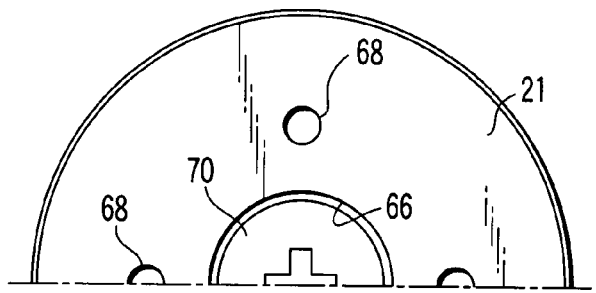
FIG. 8A is an exemplary plan view showing a spindle motor and a clamper in an HDD according to a third embodiment of the invention.
Figure 8B:
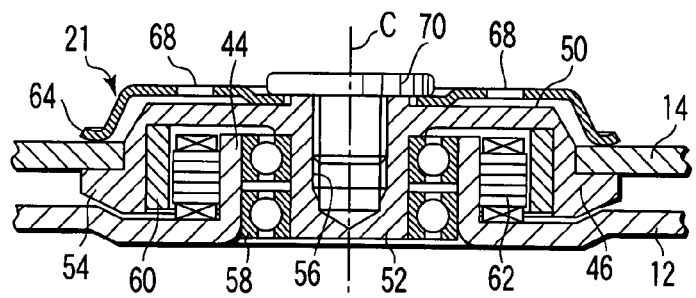
FIG. 8B is an exemplary sectional view showing the spindle motor and the clamper in the HDD according to the third embodiment.
Figure 9:
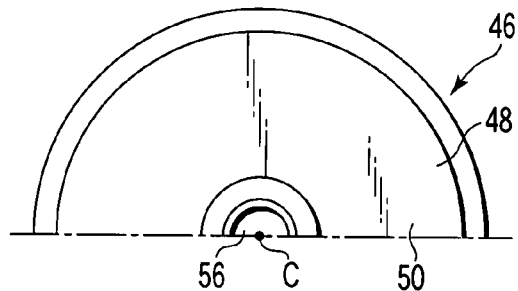
FIG. 9 is an exemplary plan view showing a support surface of a hub of the spindle motor.

The following is a description of an HDD according to a third embodiment of the invention. According to the third embodiment, as shown in FIGS. 8A and 8B and FIG. 9, a support surface 50 of a hub 46 of a spindle motor 15 is formed flat without being provided with any engaging groove or the like. Further, the support surface 50 constitutes an abutting portion to be touched by fixing pins 84 that are passed individually through positioning holes 68 in a clamper 21.

Figure 10:
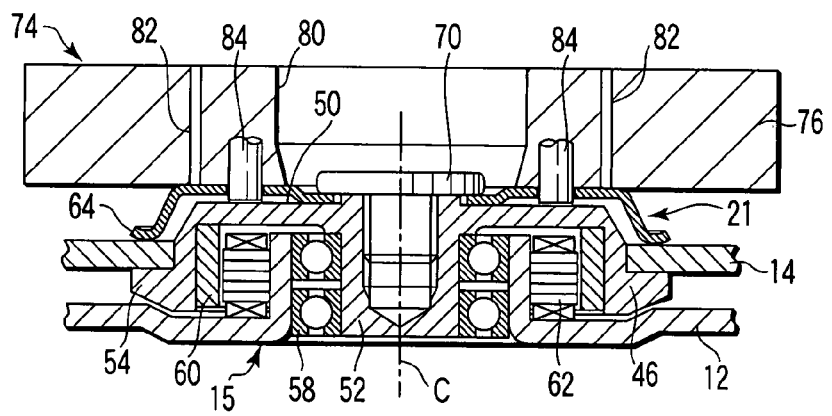
FIG. 10 is an exemplary sectional view showing the spindle motor and a mounting jig for attaching the clamper to the hub of the motor.

Since other configurations of the HDD of the third embodiment are the same as those of the foregoing first embodiment, like reference numerals are used to designate like portions, and a detailed description of those portions is omitted. In the third embodiment, the clamper 21 is attached to the hub 46 by the same method using the same mounting jig 74 of the first embodiment, as shown in FIG. 10.

The same functions and effects of the first embodiment can be also obtained from the second and third embodiments described above. According to the third embodiment, moreover, the hub of the spindle motor need not be provided with any groove or the like, so that the manufacturing cost can be reduced.

The present invention is not limited directly to the embodiments described herein, and its components may be embodied in modified forms without departing from the scope or spirit of the invention. Further, various inventions may be made by suitably combining a plurality of components described in connection with the foregoing embodiments. For example, some of the components according to the foregoing embodiments may be omitted. Furthermore, components according to different embodiments may be combined as required.

For example, the disk device of this invention is not limited to one that uses 0.85-inch disks, but the invention is also applicable to disk devices that use 1.0- or 1.8-inch disks. The numbers of magnetic disks and magnetic heads are not limited to the foregoing embodiments but may be increased as required.

What is claimed is:

1. A disk device comprising:
a disk-shaped recording medium;
a drive motor comprising a rotatable hub fitted with the recording medium, the drive motor configured to rotate the recording medium;
a disk-shaped clamper which is attached to the hub and holds the recording medium;
a head configured to record and reproduce information to and from the recording medium; and
a head actuator configured to support the head for movement and cause the head to move with respect to the recording medium, wherein
the disk-shaped clamper comprises a center aperture formed on a central axis of rotation of the drive motor and at least one positioning hole eccentric to the central axis of rotation, the disk-shaped clamper being fixed to the hub by a fixing screw driven into the hub through the center aperture,
the hub comprises a support surface opposed to the disk-shaped clamper and an annular engaging groove formed in the support surface to be coaxial with the central axis of rotation and opposed to the positioning hole and the disk-shaped clamper, the engaging groove continuously extends in a ring shape around the central axis and is configured to be engaged with a fixing pin which is passed through the positioning hole of the disk-shaped clamper.

2. The disk device according to claim 1, wherein the disk-shaped clamper has a peripheral edge portion in contact with an inner peripheral edge portion of the recording medium, and the hub has a flange, and the inner peripheral edge portion of the recording medium is held between the flange and the peripheral edge portion of the disk-shaped clamper.

3. A disk device comprising:
a disk-shaped recording medium;
a drive motor comprising a rotatable hub fitted with the recording medium, configured to rotate the recording medium;
a disk-shaped clamper which is attached to the hub and holds the recording medium;
a head configured to record and reproduce information to and from the recording medium; and
a head actuator configured to support the head for movement and cause the head to move with respect to the recording medium, wherein
the clamper comprises a center aperture formed on a central axis of rotation of the drive motor and at least one positioning hole eccentric to the central axis of rotation, the clamper being fixed to the hub by a fixing screw driven into the hub through the center aperture,
the hub comprises a support surface opposed to the clamper, an annular engaging groove formed in the support surface to be coaxial with the central axis of rotation and opposed to the positioning hole, and an annular rib provided in the engaging groove to be coaxial with the central axis of rotation, the rib forming an abutting portion against which a fixing pin which is passed through the positioning hole of the clamper abuts.

4. The disk device according to claim 3, wherein the clamper has a peripheral edge portion in contact with an inner peripheral edge portion of the recording medium, and the hub has a flange, and the inner peripheral edge portion of the recording medium is held between the flange and the peripheral edge portion of the clamper.

* * * * *